United States Patent [19]

Shube

[11] Patent Number: 4,858,491
[45] Date of Patent: Aug. 22, 1989

[54] FAIL-FREE ACTUATOR ASSEMBLY

[75] Inventor: Eugene E. Shube, Elmont, N.Y.

[73] Assignee: Plessey Incorporated, White Plains, N.Y.

[21] Appl. No.: 183,928

[22] Filed: Apr. 20, 1988

Related U.S. Application Data

[63] Continuation of Ser. No. 146,301, Jan. 21, 1988, abandoned.

[51] Int. Cl.⁴ .............................................. F16H 37/08
[52] U.S. Cl. .................................... 74/665 B; 74/89.15; 74/424.8 R; 74/665 P; 192/141; 192/143
[58] Field of Search ............ 74/665 A, 665 B, 665 D, 74/665 N, 665 P, 675, 424.8 R, 89.15; 192/141, 143, 150

[56] References Cited

U.S. PATENT DOCUMENTS

| | | | |
|---|---|---|---|
| 2,630,022 | 3/1953 | Terdina | 74/424.8 |
| 3,277,736 | 10/1966 | Goodman | 192/141 UX |
| 3,682,283 | 8/1972 | Sato | 192/141 |
| 3,735,228 | 5/1973 | Redmond | 318/564 |
| 3,766,790 | 10/1973 | Weir | 74/89.15 |
| 3,858,452 | 1/1925 | Gatland et al. | 74/424.8 R X |
| 3,950,686 | 4/1976 | Randall | 318/564 |
| 4,046,241 | 9/1977 | Furtah | 192/150 |
| 4,094,481 | 6/1978 | DeWalt | 244/194 |
| 4,162,438 | 7/1979 | Osder | 318/564 |
| 4,179,944 | 12/1979 | Conner | 74/89.15 |
| 4,226,129 | 10/1980 | Henderson | 74/424.8 R X |
| 4,289,996 | 9/1981 | Barnes et al. | 318/38 |
| 4,304,375 | 12/1981 | Builta et al. | 244/17.13 |
| 4,375,770 | 3/1983 | Druet | 74/424.8 |
| 4,574,654 | 3/1986 | Griffiths | 74/625 |
| 4,591,313 | 5/1986 | Miyatake et al. | 416/155 |
| 4,603,594 | 8/1986 | Grimm | 74/89.15 |
| 4,614,128 | 9/1986 | Fickler | 74/424.8 |
| 4,637,272 | 1/1987 | Teske et al. | 74/424.8 |
| 4,663,985 | 5/1987 | Metcalf et al. | 74/661 |
| 4,666,026 | 5/1987 | Poulin | 192/141 |
| 4,745,815 | 5/1988 | Klopfenstein | 74/424.8 R |
| 4,751,988 | 6/1988 | Metcalf | 192/141 X |

FOREIGN PATENT DOCUMENTS

2526082  2/1976  Fed. Rep. of Germany ..... 74/89.15

Primary Examiner—Dwight G. Diehl
Attorney, Agent, or Firm—Robert R. Jackson; John E. Nathan

[57] ABSTRACT

A mechanical actuator assembly which automatically releases the load controlled by the actuator when the actuator jams or otherwise fails. The actuator assembly has two kinetic energy sources, the outputs of which are normally summed for application to the load. A monitoring device monitors the two kinetic energy outputs. When the relationship between those outputs deviates substantially from a predetermined relationship, the load is disconnected from the actuator assembly.

29 Claims, 8 Drawing Sheets

FAIL-FREE ACTUATOR ASSEMBLY

This is a continuation of U.S. patent application Ser. No. 146,301, filed Jan. 21, 1988, now abandoned.

BACKGROUND OF THE INVENTION

This invention relates to mechanical actuators, and more particularly to mechanical actuators which release the actuated load when the actuator fails.

There are many requirements for mechanical actuators which release the actuated load when the actuator fails, thereby rendering the load free to move (e.g., under the control of another actuator which has not failed). For example, many of the movable flight control surfaces in aircraft are positioned by redundant actuators. If one of these actuators were to fail, it may be vitally important that the failed actuator not lock the associated flight control surface in the position at which that actuator failed. Instead, the failed actuator should leave the associated flight control surface "free" so that it can continue to be moved by the other actuator or actuators which have not failed. Actuators which thus leave the associated load free to move when the actuator fails are sometimes referred to herein as "fail-free" actuators. "Fail-free" does not mean that the actuator cannot fail; it merely means that if the actuator does fail, it does not fix or lock up the load, but rather leaves the load free to move.

SUMMARY OF THE INVENTION

In accordance with the principles of this invention, a fail-free actuator assembly includes first and second means for respectively producing concurrent first and second kinetic energy outputs, third means for producing a third kinetic energy output which is the sum of the first and second kinetic energy outputs, fourth means for normally applying the third kinetic energy output to a load to cause the load to move, fifth means for monitoring the first and second kinetic energy outputs and for producing an output indication in the event that the relationship between the first and second kinetic energy outputs deviates from a predetermined relationship, and sixth means responsive to the output indication for disconnecting the load from the third kinetic energy output.

Further features of the invention, its nature and various advantages will be more apparent from the accompanying drawings and the following detailed description of the invention.

DETAILED DESCRIPTION OF THE PREFERRED EMBODIMENTS

Figure 1:
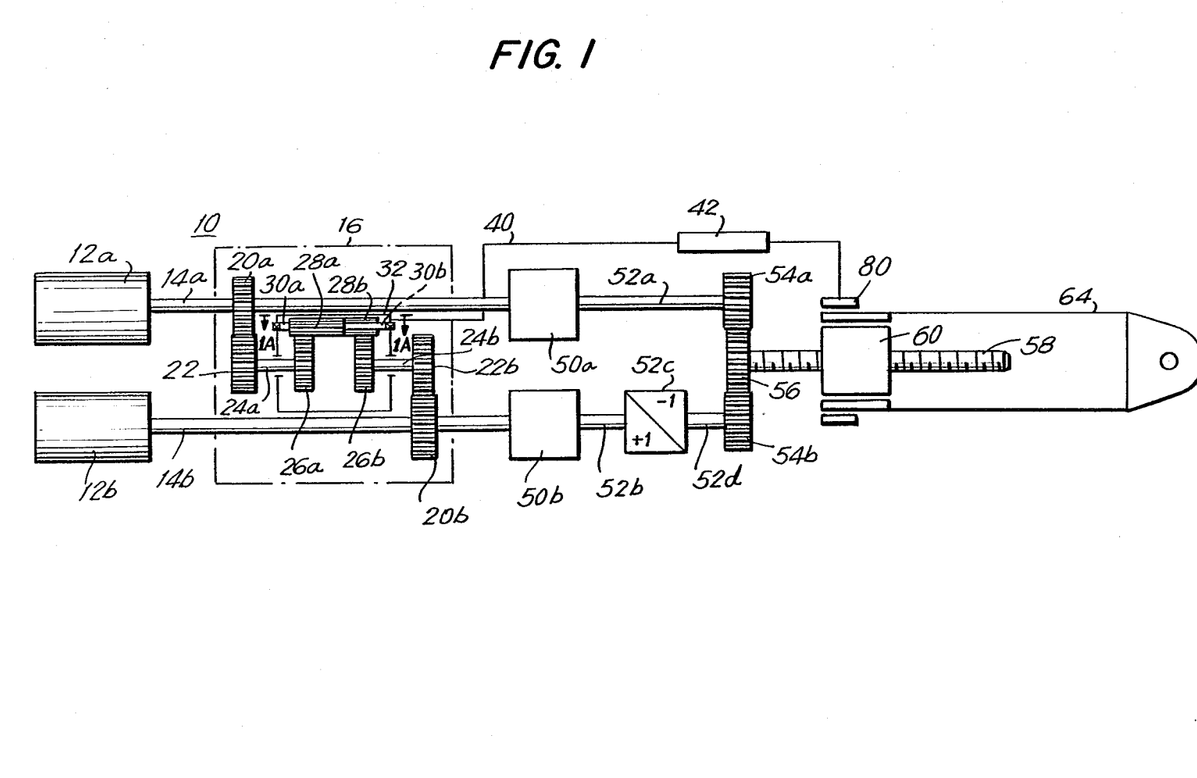
FIG. 1 is a schematic block diagram of an illustrative embodiment of the actuator assembly of this invention.
Figure 1A:
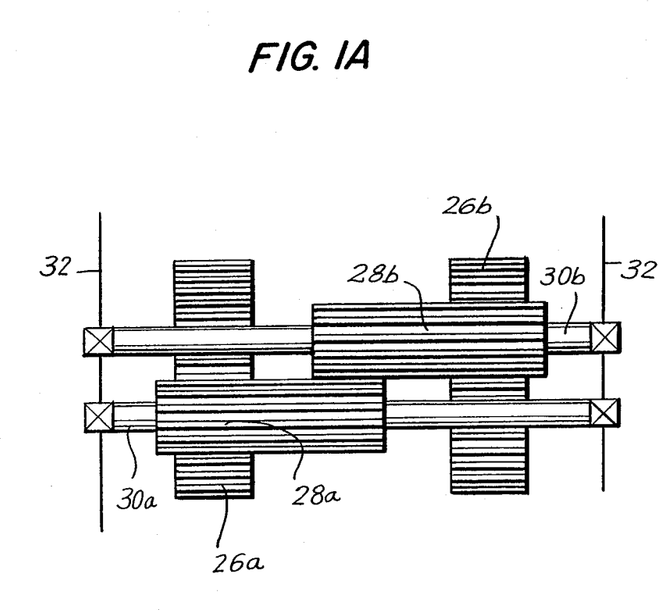
FIG. 1A is a view taken along the line 1A—1A in FIG. 1.

As shown in FIGS. 1 and 1A, a typical fail-free actuator assembly 10 constructed in accordance with the principles of this invention includes first and second motors 12a and 12b, each of which may be a conventional rotary electric motor. Motors 12 are preferably identical to one another (although they may rotate in opposite directions). When actuator assembly 10 is operating normally, both motors rotate at the same time at the same speed. The kinetic energy output of motor 12a is rotating armature shaft 14a; the kinetic energy output of motor 12b is rotating armature shaft 14b.

Shafts 14 pass through monitor device 16. Although those skilled in the art will appreciate that many other types of monitor devices are possible within the scope of this invention, in the depicted embodiment, monitor device 16 is a mechanical differential-type device which produces an output proportional to the difference in the rate at which shafts 14 rotate. Spur gear 20a rotates with shaft 14a, and spur gear 20b similarly rotates with shaft 14b. Spur gear 22a meshes with spur gear 20a and thereby transmits the rotation of spur gear 20a to spur gear 26a via shaft 24a. Elements 22b, 24b, and 26b perform similarly with respect to the rotation of spur gear 20b. Spur gear 26a meshes with spur gear 28a, which is rotatably mounted on a shaft 30a connected to housing or cage 32. Spur gear 26b meshes with spur gear 28b, which is rotatably mounted on a shaft 30b connected to cage 32. Spur gears 28 mesh with one another. Cage 32 is rotatable about the coaxial longitudinal axes of shafts 24. Accordingly, as long as shafts 14 are rotating in the opposite directions at the same speed, gears 28 also rotate in the opposite directions at the same speed and therefore hold cage 32 stationary (i.e., prevent cage 32 from rotating in either direction about the longitudinal axes of shafts 24). On the other hand, if shafts 14 begin to rotate at different speeds, gears 28 also rotate at different speeds, which causes cage 32 to rotate about the longitudinal axes of shafts 24. The rotational position of cage 32 is therefore proportional to the time integral of the instantaneous difference in the angular speeds of shafts 14. Stated another way, the rotational position of cage 32 indicates the cumulative difference in the amounts of angular motion of shafts 14, the relative angular positions of shafts 14, or the phase difference between shafts 14. The rotational position of cage 32 is conveyed to quick-release actuator 80 by member 40. Note that monitor differential 16 does not transmit the kinetic energy outputs of motors 12; it merely monitors those outputs (in particular, the relative rates, amounts, or phases of those outputs).

On the side of monitor differential 16 remote from motor 12a, shaft 14a is connected to torque limiter 50a. Shaft 14b is similarly connected to torque limiter 50b. Each of torque limiters 50 is a conventional device (e.g., a detent- or clutch-type device) for limiting the amount of torque that can be transmitted from the associated input shaft 14 to the associated output shaft 52. Preferably, the torque limits of devices 50a and 50b are different from one another. (Either of torque limiters 50 can be eliminated if desired.) During normal operation of the apparatus, devices 50a and 50b transmit all of the torque from shafts 14 to shafts 52. If the torque required to turn the output shaft 52 of either torque limiter becomes too high, however, the associated motor 12 has sufficient power to cause that torque limiter to "break out", thereby allowing the associated shaft 14 to turn faster than normal relative to that shaft 52.

Conventional reversing mechanism 52c is provided to cause shaft 52d to rotate in the opposite direction from shaft 52b. Spur gear 54a rotates with shaft 52a, spur gear 54b rotates with shaft 52d, and both of gears 54 mesh with spur gear 56. Accordingly, gears 54 and 56 normally cooperate to sum the kinetic energy outputs of motors 12 and to apply that kinetic energy sum to rotate threaded shaft 58.

Shaft 58 threadedly engages collar 60 (see FIG. 2) so that rotation of shaft 58 causes translation of collar 60 parallel to the longitudinal axis of shaft 58. Collar 60 is normally linked to bracket 64 by a plurality of balls 62 spaced around the circumference of collar 60. The load to be moved by actuator assembly 10 is connected to the right-hand end of bracket 64 in FIG. 1. Each ball 62 is mutually disposed in a recess 61 in the outer surface of collar 60 and an aperture 65 in bracket 64. Each ball is normally retained in elements 61 and 65 by quick-release actuator 80, which is shown in more detail in FIG. 3. As shown there, actuator 80 has a longitudinal projection 82 adjacent each ball 62. Between projections 82, however, actuator 80 has recesses 84. Accordingly, if actuator 80 is rotated by a sufficient amount in either direction about the longitudinal axis of shaft 58, balls 62 will no longer be retained in elements 61 and 65 by projections 82, but will instead be free to pass through recesses 84 and adhere to magnets 66. This uncouples bracket 64 from collar 60. As mentioned above, the angular position of quick-release actuator 80 is controlled by the angular position of cage 32. Actuator 80 is constrained to move axially with bracket 64 by lugs 88 extending radially inwardly into annular slot 68 in the outer surface of bracket 64. Telescopic coupling 42 (i.e., a coupling which allows quick-release actuator 80 to move longitudinally but not angularly relative to cage 32) is included between elements 32 and 80. In particular, telescopic coupling 42 may include lugs 44 extending radially outwardly from coupling member 46 (connected to cage 32) into axially extending slots 86 in actuator 80. Once bracket 64 has been uncoupled from collar 60 by the release of balls 62, bracket 64 is free to move axially relative to collar 60. Accordingly, actuator assembly 10 thereafter plays no part in controlling the position of the load connected to bracket 64, and other actuator assemblies (not shown) which have not failed can continue to move the load without hindrance from failed actuator assembly 10.

Considering now some of the possible modes of failure that could cause actuator assembly 10 to uncouple from the load, if either motor 12 were to jam, shafts 14 would no longer be rotating at the same rate. This would cause cage 32 to rotate, thereby rotating actuator 80 and uncoupling the load. Similarly, if any portion of the apparatus downstream from torque limiters 50 were to begin to offer excessive resistance, the torque limiter with the lower threshold would allow associated shaft 14 to rotate faster than the other shaft 14. Once again, this would cause cage 32 to rotate, thereby rotating actuator 80 and uncoupling the load.

Figure 2:
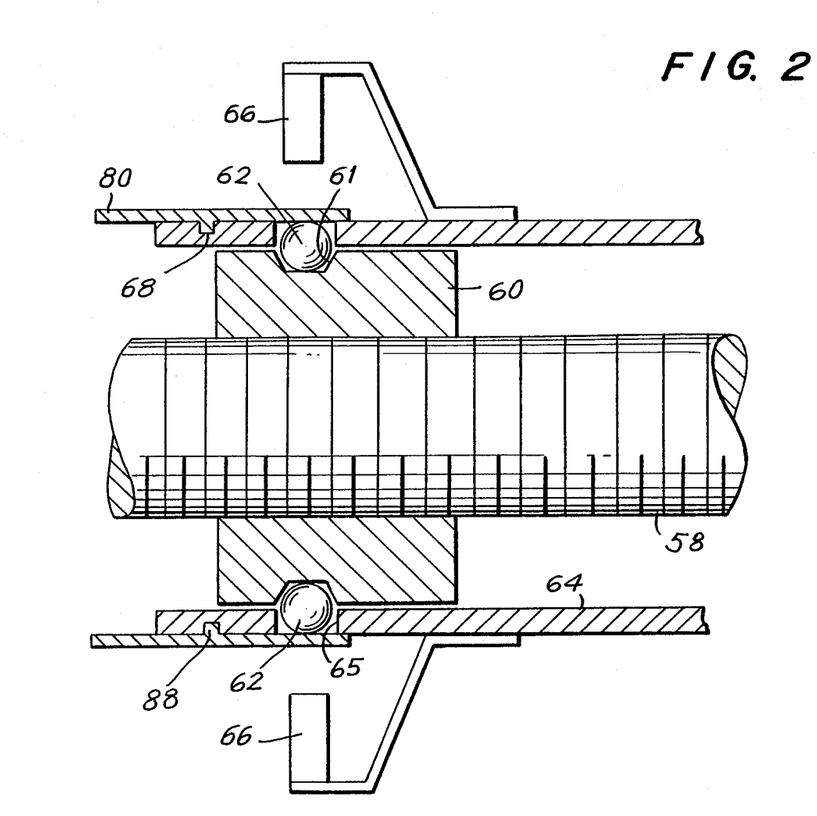
FIG. 2 is a simplified longitudinal sectional view of a portion of the apparatus of FIG. 1.
Figure 3:
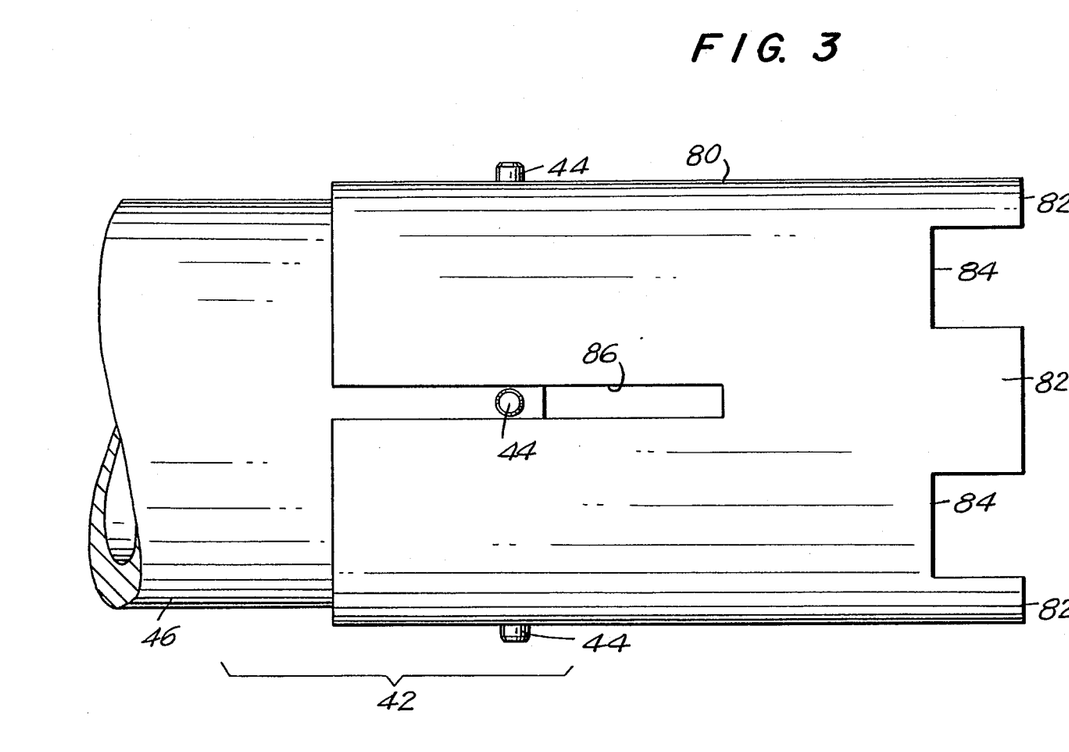
FIG. 3 is a simplified elevational view of a portion of the apparatus of FIG. 1.
Figure 4:
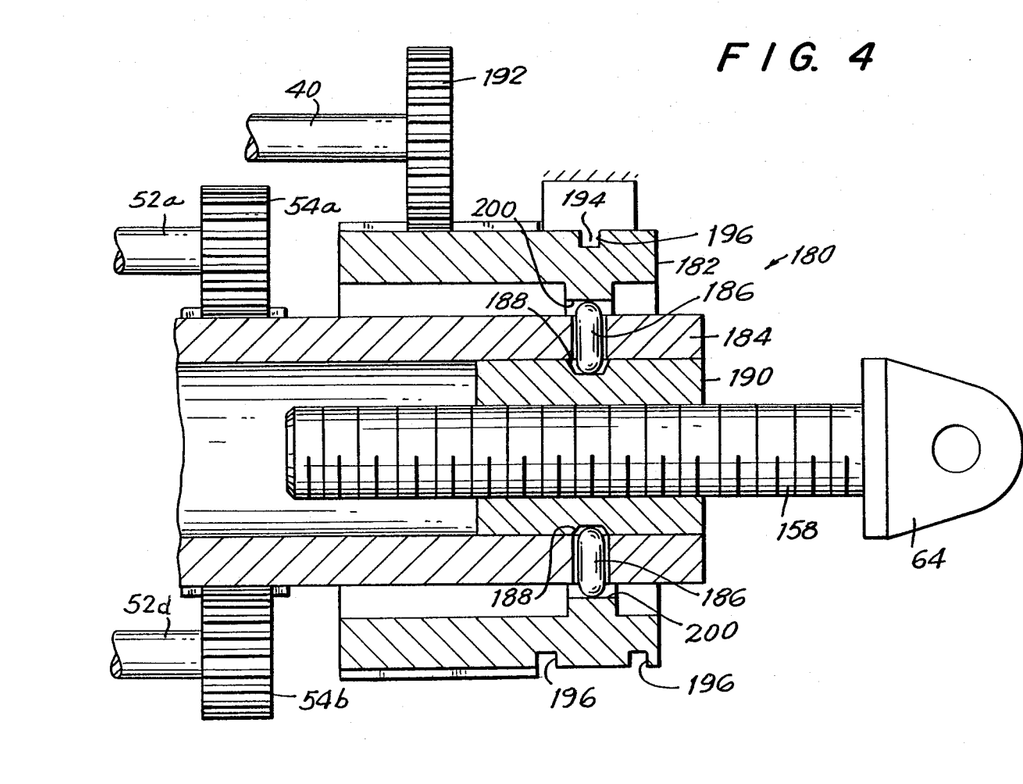
FIG. 4 is a simplified longitudinal sectional view of an alternative embodiment of a portion of the apparatus of FIG. 1.

The quick-release actuator 80 shown in FIGS. 1–3 releases when actuator 80 rotates about the longitudinal axis of shaft 58. FIG. 4 shows an alternative embodiment in which quick release actuator 180 releases when capture ring 182 translates parallel to the longitudinal axis of shaft 158. Elements 40, 52, and 54 in FIG. 4 are the same as the correspondingly numbered elements in FIG. 1. Spur gears 54 engage teeth on the outer surface of hollow cylindrical member 184 in order to rotate member 184 about the longitudinal axis of shaft 158 when gears 54 are rotated. Assuming that quick-release actuator 180 is engaged as shown in FIG. 4, pins 186 (which extend through member 184 into recesses 188 in the outer surface of collar 190) cause collar 190 to rotate with member 184. Collar 190 threadedly engages shaft 158 so that shaft 158 translates parallel to its longitudinal axis in response to rotation of collar 190. Bracket 64 (similar to bracket 64 in FIG. 1) is connected to the end of shaft 158 and therefore translates with shaft 158.

Pins 186 are normally held in recesses 188 by capture ring 182. Shaft 40 conveys any rotation of cage 32 (FIG. 1) to spur gear 192 which engages axially extending teeth in the outer surface of capture ring 182. A fixed finger 194 extends into a spiral recess 196 also formed in the outer surface of capture ring 182. Normally, shaft 40 does not rotate, so that capture ring 182 also does not rotate. If the actuator malfunctions, however, cage 32 rotates as described above in connection with FIG. 1. This causes elements 40, 192, and 182 to also rotate. As capture ring 182 rotates, elements 194 and 196 cooperate to cause the capture ring to translate parallel to the longitudinal axis of shaft 158. As soon as annularly inwardly projecting capture ring surface 200 is no longer adjacent the outer ends of pins 186, those pins are free to move out of recesses 188, thereby disconnecting elements 190, 158, and 64 from the remainder of the apparatus. This has the same effect as releasing balls 62 in FIG. 2. If desired, any of several techniques, some of which are illustrated in FIGS. 5–10 and described below, can be used to capture pins 186 in their radially outward positions in the same way that magnets 66 capture balls 62 in the embodiment of FIG. 1.

Figure 5A:
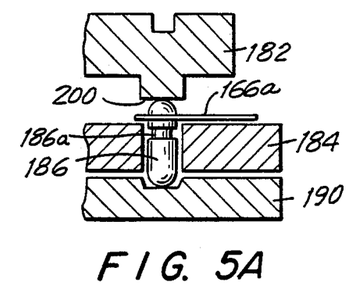
FIG. 5A is a view similar to a portion of FIG. 4 showing one possible modification of that apparatus.
Figure 5B:
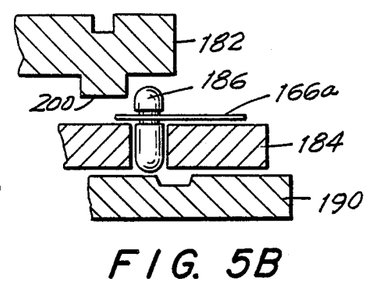
FIG. 5 is a view similar to FIG. 5A showing that apparatus after release.
Figure 6A:
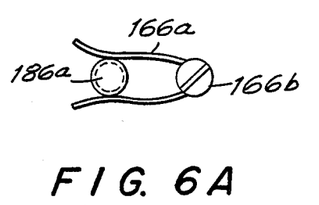
FIGS. 6A and 7A show alternative ways of constructing a portion of the apparatus of FIG. 5, and FIGS. 6B and 7B show the apparatus of FIGS. 6A and 7A, respectively, in the operating condition depicted in FIG. 5B.
Figure 6B:
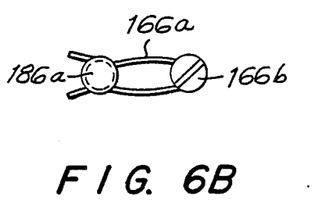
Figure 7A:
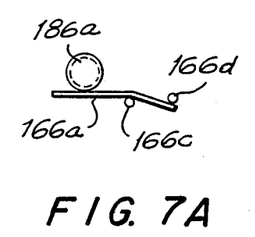
Figure 7B:
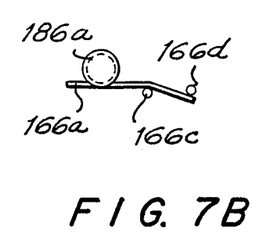

In FIG. 5, pin 186 has an annular recess 186a, and the capture device is a spring 166a which springs into recess 186a as shown in FIG. 5B when pin 186 moves radially outward. Spring 166a may either have two opposing tines and be secured to cyindrical member 184 by screw 166b as shown in FIG. 6, or may have a single tine and be both secured and prestressed by pins 166c and 166d.

Figure 8A:
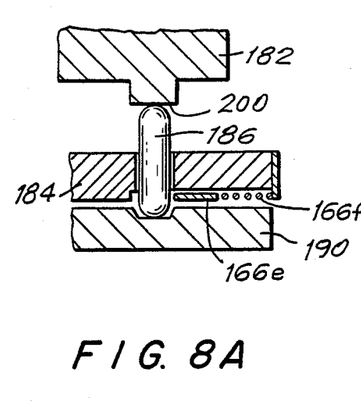
FIGS. 8A and 8B are respectively similar to FIGS. 5A and 5B, and show another possible modification of the apparatus of FIG. 4.
Figure 8B:
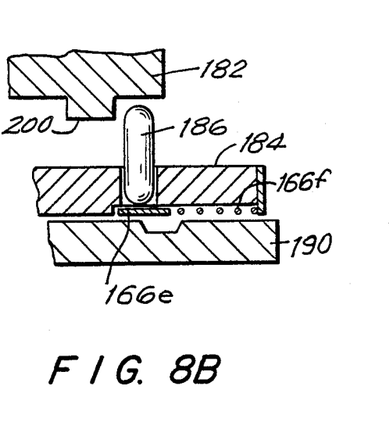
Figure 9:
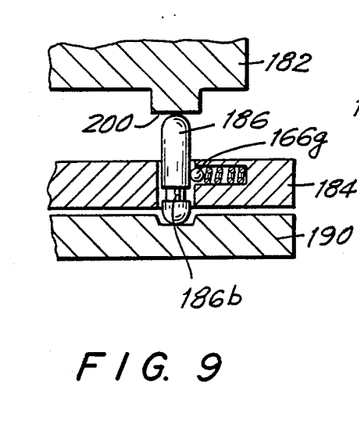
FIGS. 9 and 10 are similar to FIGS. 5A and 8A, and show two more possible modifications of the apparatus of FIG. 4.
Figure 10:
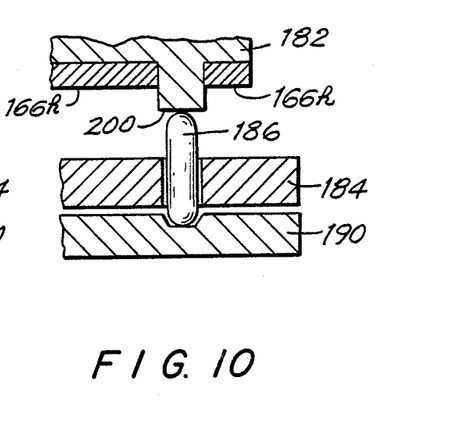

In FIG. 8, a shutter or sleeve 166e actuated by spring 166f prevents pin 186 from returning to its radially inward position after it has moved outward. In FIG. 9, this function is performed by spring-loaded ball 166g entering annular slot 186b in pin 186. And in FIG. 10, this function is performed by magnets 166h on capture ring 182.

Figure 11:
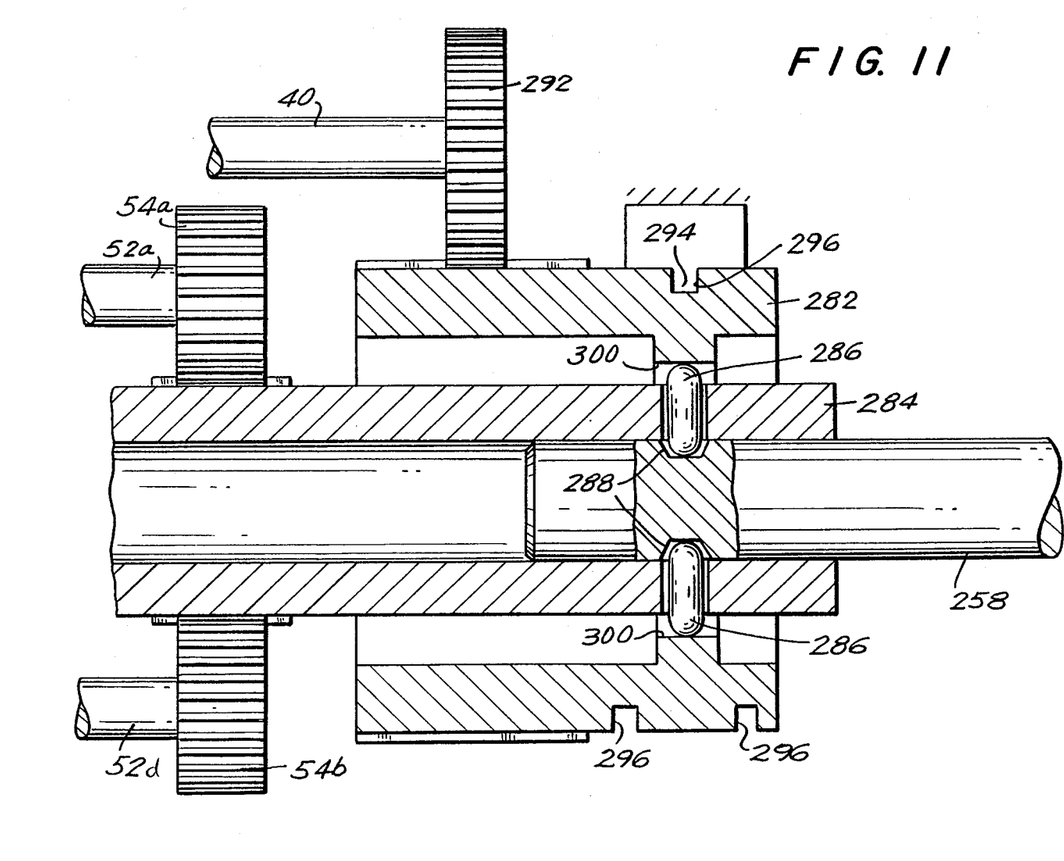
FIG. 11 is a simplified longitudinal sectional view of another alternative embodiment of a portion of the apparatus of FIG. 1.

The actuators shown in FIGS. 1–4 and described above are linear actuators (i.e., brackets 64 move linearly). However, the principles of this invention are equally applicable to fail-free rotary actuators. FIG. 11 shows how the embodiment of FIG. 4 can be modified to produce a fail-free rotary actuator. Elements in FIG. 11 which are substantially the same as elements in FIG. 4 have either the same reference numbers in FIG. 11 or reference numbers which are increased by 100 over the corresponding reference numbers in FIG. 4. As in FIG. 4, spur gears 54 engage teeth in the outer surface of hollow cylindrical member 284. Pins 286 extend through member 284 into recesses 288 in output shaft 258. Accordingly, rotation of spur gears 54 normally causes rotation of member 284 and output shaft 258. If the actuator fails, however, cage 32 (FIG. 1) rotates, thereby rotating shaft 40, spur gear 292, and capture ring 282. When capture ring 282 is thus rotated, stationary tooth 294 cooperates with spiral groove 296 to cause the capture ring to move axially. When capture ring surface 300 is no longer opposite the ends of pins 286, those pins are free to move out of recesses 288, thereby disconnecting output shaft 258 from the remainder of the apparatus. If desired, pins 286 can be captured in their radially outward positions as described above in connection with FIG. 4 (e.g., by any of the techniques illustrated in FIGS. 5–10).

I claim:

1. An actuator assembly for selectively moving a load, said actuator assembly comprising:
   first means for normally producing a first kinetic energy output;
   second means for normally producing a second kinetic energy output concurrently with said first kinetic energy output;
   third means responsive to said first and second kinetic energy outputs for normally producing a third kinetic energy output which is the sum of said first and second kinetic energy outputs;
   fourth means for normally applying said third kinetic energy output to said load to cause said load to move;
   first force limiting coupling means operatively connected between said first means and said third means for preventing force in excess of a first predetermined force threshold from being transmitted from said first means to said third means via said first kinetic energy output;
   fifth means for monitoring said first and second kinetic energy outputs and for producing an output indication in the event that the relationship between said first and second kinetic energy outputs deviates from a predetermined relationship; and
   sixth means responsive to said output indication for causing said fourth means to disconnect said load from said third kinetic energy output.

2. The actuator assembly defined in claim 1 wherein said load is free to move relative to said third kinetic energy output when said sixth means causes said fourth means to disconnect said load from said third kinetic energy output.

3. The actuator assembly defined in claim 1 wherein said fifth means comprises:
   seventh means for determining the time integral of the instantaneous difference between the motions of said first and second kinetic energy outputs and for producing said output indication in the event that said time integral exceeds a predetermined time integral threshold.

4. The actuator assembly defined in claim 3 wherein said seventh means comprises:
   a mechanical differential assembly for producing motion of an output member proportional to the difference between the amount of motion of first and second input members;
   means for coupling said first input member to said first kinetic energy output; and
   means for coupling said second input member to said second kinetic energy output, said motion of said output member being said output indication.

5. The actuator assembly defined in claim 1 wherein said output indication is motion of a mechanical element, wherein said fourth means comprises latch means for releasably connecting said third kinetic energy output to said load, and wherein said sixth means comprises latch release means for releasing said latch means in response to motion of said mechanical element.

6. The actuator assembly defined in claim 5 wherein said latch means is a mechanical latch, wherein said latch release means is a mechanical latch release, and wherein said actuator assembly further comprises a mechanical linkage between said mechanical element and said mechanical latch release.

7. The actuator assembly defined in claim 1 further comprising:
   second force limiting coupling means operatively connected between said second means and said third means for preventing force in excess of a second predetermined force threshold from being transmitted from said second means to said third means via said second kinetic energy output.

8. The actuator assembly defined in claim 7 wherein said first and second predetermined force thresholds are substantially different from one another.

9. The actuator assembly defined in claim 8 wherein said fifth means comprises:
   a mechanical differential assembly for producing motion of an output member proportional to the difference between the amount of motion of first and second input members, said motion of said output member being said output indication;
   means for connecting said first input member to said first kinetic energy output so that the motion of said first input member is proportional to the motion of said first kinetic energy output; and
   means for connecting said second input member to said second kinetic energy output so that the motion of said second input member is proportional to the motion of said second kinetic energy output.

10. The actuator assembly defined in claim 9 wherein said fourth means comprises a releasable mechanical interconnection between said third kinetic energy output and said load, and wherein said sixth means comprises mechanical means responsive to motion of said output member for releasing said mechanical interconnection.

11. The actuator assembly defined in claim 1 wherein said first and second means respectively comprise first and second motors.

12. The actuator assembly defined in claim 11 wherein said first motor produces said first kinetic energy output by rotating a first shaft, and wherein said second motor produces said second kinetic energy output by rotating a second shaft.

13. The actuator assembly defined in claim 12 wherein said first force limiting coupling means comprises:
   a torque limiter connected between said first shaft and said third means for limiting the amount of torque that can be applied to said third means from said first shaft.

14. The actuator assembly defined in claim 13 wherein said third means produces said third kinetic energy output by rotating a third shaft.

15. The actuator assembly defined in claim 14 wherein said fourth means comprises:
   threading on said third shaft;
   a follower member for engaging said threading so that when said third shaft is rotated about its longitudinal axis, said follower member translates parallel to said longitudinal axis; and
   coupling means for releasably coupling said load to said follower member.

16. The actuator assembly defined in claim 15 wherein said sixth means causes said coupling means to uncouple said load from said follower member.

17. The actuator assembly defined in claim 16 wherein said fifth means comprises:
   a first gear rotatable with said first shaft;
   a second gear rotatable with said second shaft; and
   a differential gear assembly including differential gear means rotatably mounted in a housing member, said differential gear means engaging both of said first and second gears so that when said first and second gears are rotating at the same rate, said differential gear means holds said housing member stationary, but when said first and second gears are not rotating at the same rate, said differential gear means causes said housing member to move.

18. The actuator assembly defined in claim 17 wherein said sixth means comprises means for connecting said housing member to said coupling means so that motion of said housing member causes said coupling means to uncouple said load from said follower member.

19. The actuator assembly defined in claim 18 wherein said coupling means comprises:
   a recess in a surface of said follower member which is substantially parallel to said longitudinal axis of said third shaft;
   a collar adjacent said surface having an aperture adjacent said recess;
   a retainer movably mounted relative to said collar on the side of said collar remote from said aperture;
   means for connecting said housing member to said retainer so that said retainer is initially adjacent said aperture, but so that when said housing member moves, said retainer moves away from said aperture; and
   a ball mutually disposed in said recess and said aperture and retained therein by said retainer unless said retainer member is moved away from said aperture by motion of said housing member.

20. The actuator assembly defined in claim 14 wherein said fourth means comprises:
   a follower member concentric with said third shaft;
   coupling means for releasably coupling said follower member to said third shaft so that when said third shaft is rotated about its longitudinal axis, said follower member rotates with said third shaft; and
   a fourth shaft in concentric threaded engagement with said follower member so that when said follower member rotates with said third shaft, said follower member translates parallel to the longitudinal axis of said third shaft.

21. The actuator assembly defined in claim 20 wherein said sixth means causes said coupling means to uncouple said follower member from said third shaft.

22. The actuator assembly defined in claim 21 wherein said fifth means comprises:
   a first gear rotatable with said first shaft;
   a second gear rotatable with said second shaft; and
   a differential gear assembly including differential gear means rotatably mounted in a housing member, said differential gear means engaging both of said first and second gears so that when said first and second gears are rotating at the same rate, said differential gear means holds said housing member stationary, but when said first and second gears are not rotating at the same rate, said differential gear means causes said housing member to move.

23. The actuator assembly defined in claim 22 wherein said sixth means comprises means for connecting said housing member to said coupling means so that motion of said housing member causes said coupling means to uncouple said follower member from said third shaft.

24. The actuator assembly defined in claim 23 wherein said coupling means comprises:
   a recess in a surface of said follower member which is substantially parallel to said longitudinal axis of said third shaft;
   a pin extending through said third shaft so that a first end of said pin normally projects into said recess;
   a capture ring adjacent the second end of said pin remote from said recess for normally holding said first end of said pin in said recess; and
   means for connecting said housing member to said capture ring so that said capture ring is initially adjacent said aperture, but so that when said housing member moves, said capture ring moves away from said second end of said pin, thereby allowing said first end of said pin to escape from said recess.

25. The actuator assembly defined in claim 14 wherein said fourth means comprises:
   a fourth shaft concentric with said third shaft; and
   coupling means for releasably coupling said fourth shaft to said third shaft so that when said third shaft is rotated about its longitudinal axis, said fourth shaft rotates with said third shaft.

26. The actuator assembly defined in claim 25 wherein said sixth means causes said coupling means to uncouple said fourth shaft from said third shaft.

27. The actuator assembly defined in claim 26 wherein said fifth means comprises:
   a first gear rotatable with said first shaft;
   a second gear rotatable with said second shaft; and
   a differential gear assembly including differential gear means rotatably mounted in a housing member, said differential gear means engaging both of said first and second gears so that when said first and second gears are rotating at the same rate, said differential gear means holds said housing member stationary, but when said first and second gears are not rotating at the same rate, said differential gear means causes said housing member to move.

28. The actuator assembly defined in claim 27 wherein said sixth means comprises means for connecting said housing member to said coupling means so that motion of said housing member causes said coupling means to uncouple said fourth shaft from said third shaft.

29. The actuator assembly defined in claim 28 wherein said coupling means comprises:
- a recess in the surface of said fourth shaft which is substantially parallel to said longitudinal axis of said third shaft;
- a pin extending through said third shaft so that a first end of said pin normally projects into said recess;
- a capture ring adjacent the second end of said pin remote from said recess for normally holding said first end of said pin in said recess; and
- means for connecting said housing member to said capture ring so that said capture ring is initially adjacent said aperture, but so that when said housing member moves, said capture ring moves away from said second end of said pin, thereby allowing said first end of said pin to escape from said recess.

* * * * *